United States Patent [19]

Yasukawa et al.

[11] Patent Number: 4,595,989

[45] Date of Patent: Jun. 17, 1986

[54] POINT MEASURING PROCESS FOR PRESET ROBOT

[75] Inventors: Kazuyoshi Yasukawa; Yoshio Hayashi, both of Nagano, Japan

[73] Assignee: Kabushiki Kaisha Sankyo Seiki Seisakusho, Nagano, Japan

[21] Appl. No.: 422,507

[22] Filed: Sep. 23, 1982

[30] Foreign Application Priority Data

Oct. 5, 1981 [FR] France .................. 81 158477

[51] Int. Cl.⁴ .................. G05B 19/42; G05B 19/18; B25J 9/00
[52] U.S. Cl. .................. 364/513; 364/192; 364/193; 318/568; 901/4
[58] Field of Search .................. 318/562, 568; 364/513, 364/474, 478, 191, 192, 193, 174, 177; 901/3, 4, 5

[56] References Cited

U.S. PATENT DOCUMENTS

| | | | |
|---|---|---|---|
| 4,132,938 | 1/1979 | Sano et al. .................. | 901/4 X |
| 4,140,953 | 2/1979 | Dunne .................. | 364/513 X |
| 4,260,940 | 4/1981 | Engelberger et al. .................. | 318/568 X |
| 4,338,672 | 7/1982 | Perzley et al. .................. | 364/513 |
| 4,380,696 | 4/1983 | Masaki .................. | 364/513 X |
| 4,402,053 | 8/1983 | Kelley et al. .................. | 364/513 |
| 4,403,281 | 9/1983 | Holmes et al. .................. | 318/568 X |
| 4,409,650 | 10/1983 | Nogochi .................. | 364/193 |
| 4,424,472 | 1/1984 | Jacot-Descombes et al. ..... | 364/513 X |
| 4,458,321 | 7/1984 | Whitney et al. .................. | 364/192 X |

Primary Examiner—Jerry Smith
Assistant Examiner—Jon D. Grossman
Attorney, Agent, or Firm—Sughrue, Mion, Zinn, Macpeak and Seas

[57] ABSTRACT

A process for controlling an industrial robot in which most data for controlling the robot can be supplied using a preset process without moving the robot and only data for regions in which very precise control is required need be prepared by actually moving the robot. A programming unit is provided separate from but connectable to a robot control unit. The programming unit is used to compile and transfer completed programs to the robot control unit for controlling the movements of the robot. To program the robot control unit, the programming unit and robot control unit are connected as an on-line system. Then, data describing a desired path of movement is inputted to the programming unit as a series of coordinates in Cartesian form. In regions where very precise control is required, the coordinates describing the desired path of movement are corrected using small corrective motions of the robot. The inputted data and the corrected coordinates are displayed.

5 Claims, 2 Drawing Figures

POINT MEASURING PROCESS FOR PRESET ROBOT

BACKGROUND OF THE INVENTION

The present invention relates to a process for controlling a preset industrial robot. More particularly, the invention relates to a process for measuring motion points in a preset industrial robot and for precisely controlling the movements of the robot in accordance with the measured points.

Processes for controlling industrial robots can be categorized into a preset or preprogramming process and a playback process. In the preset process, an operating program is prepared and stored without moving the robot. The stored program is then read out to cause the robot to effect the desired motions. On the other hand, in the playback process, the robot is actually moved and data describing the motions of the robot is stored. As in the case of the preset process, the stored program is read out to cause the robot to effect the desired motions. The preset process is advantageous in that it is suitable for positioning-type robot motions, and no complicated teaching procedure is necessary, although a programming unit is required. The preset process is commonly used to control assembly robots, for example. In actual applications of the preset process, motion points along a desired path of movement of the robot are indicated on a graphical representation, for example, and an operating program is prepared from the graphical representation.

The preset process, although adequate in many applications, is insufficient, for instance, for controlling the machining of a workpiece which has portions requiring a very high degree of accuracy, portions that cannot be followed on a drawing, or portions which are dimensionally different from the corresponding portions on the drawing. Although the playback process can be used in such instances, it requires a complex teaching procedure.

United Kingdom Patent Application No. 2,027,938 A describes a robot control system including an off-line teach-assist apparatus and an on-line control apparatus. Programs can be prepared in the teach-assist apparatus and then transferred to the control apparatus which utilizes the programs for directly controlling a manipulator arm of the robot. The programs utilized by the control apparatus are in the form of a projected fixed path solution, that is, a predetermined, fixed operating path of the manipulator arm. The stored data further includes projected workpiece positions for use in compensating for movement of the workpiece from a reference position. From the precomputed fixed path solution and the projected workpiece positions, movements of the manipulator arm are controlled so as to provide movements of optimum efficiency. That system does not, however, provide for display of data as it is inputted to the teach-assist apparatus nor for display of stored data. Moreover, that system does not provide any way of rapidly supplying most of the necessary coordinates representing the desired path of movement of the robot using a procedure such as a preset process with only positions in areas requiring a very high degree of accuracy being inputted or corrected by actually moving the robot.

SUMMARY OF THE INVENTION

In accordance with the present invention, a process is provided for controlling the movements of a robot in which the majority of an operating program is prepared using a preset process. For regions where a greater accuracy is required than the preset process can provide, the program content is corrected based on measured and confirmed actual positions of the robot.

More specifically, the invention provides a process for controlling the movements of a robot using a control system having separate programming and robot control units by moving a robot to coordinate positions supplied as inputs, confirming the positions, correcting the positions through small motions of the robot when there is a difference between the robot position and a desired position, and correcting the program coordinate inputs accordingly. The program for operating the robot is basically prepared by a preset process with confirmation and measurement being effected only with respect to regions in which a high degree of accuracy and positional confirmation are needed. With the process of the present invention, a program can be prepared with both high efficiency and high accuracy.

DESCRIPTION OF THE PREFERRED EMBODIMENTS

The present invention will now be described with reference to the drawings which illustrate a preferred embodiment of the present invention.

Figure 1:
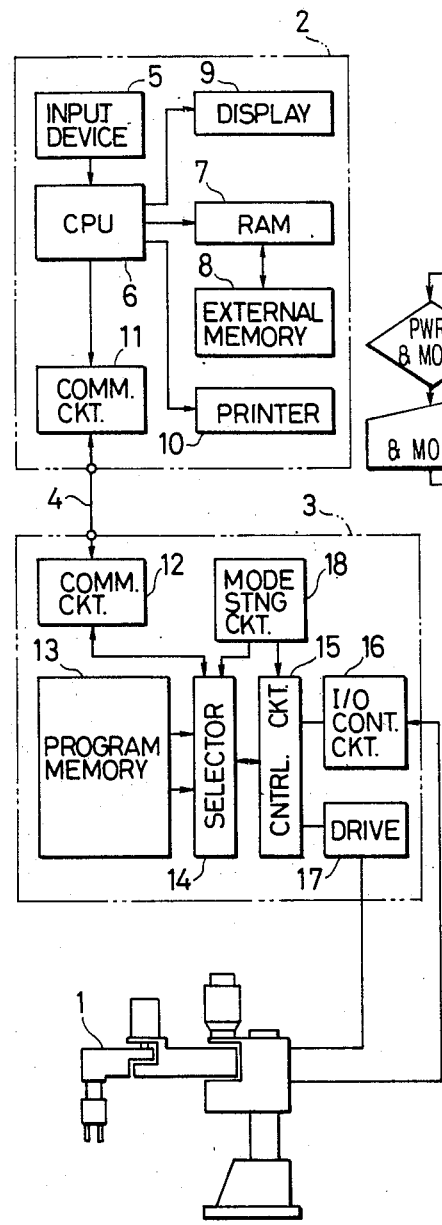
FIG. 1 is a block diagram of a control system on which the present invention is based.

FIG. 1 shows an overall system for an industrial robot 1 on which the present invention is based. The control system is composed of a programming unit 2 and a robot control unit 3. The programming unit 2 and the robot control unit 3 are separated from each other but can be connected to one another by a detachable communication cable 4.

The programming unit 2 is used to prepare and store a number of programs for operating the robot 1 and for delivering a requested one of such stored operating programs to the robot control unit 3. The programming unit 2 includes an input device 5 such as a keyboard for inputting coordinates, program data, modes, point measurement instructions, and other inputs; a program editing arithmetic processor 6 in the form of a CPU including a control unit, an arithmetic unit and a register for storing processing programs (which include editing programs, coordinate transformation formulas, a processing program for point measurements, and machine language compiling programs), editing a program based on input data from the keyboard 5, and performing operations such as coordinate transformations and conversion into machine language; a memory 7 in the form of a RAM for temporarily storing data such as program data, coordinate transformation data, and machine language instructions; an external memory 8 having a large storage capacity, such as a magnetic tape or a magnetic disk, for storing a multiplicity of edited, completed programs; a display unit 9 for displaying input data, stored data and measured values; a printer 10 for printing programs on recording paper; and a communication circuit 11 for delivering processed programs through the program editing arithmetic processor 6 to the robot control unit 3 and for receiving measured values and other data from the robot control unit 3.

The robot control unit 3 serves to control the operation of the robot 1 which, in the described embodiment, is of the polar-coordinate type. The robot control unit 3 is composed of a communication circuit 12 for receiving and delivering measured values and programs, a memory 13 for storing a plurality of programs received through the communication circuit 12, a selector unit 14 for changing data buses to select writing or reading of the operating programs, a control circuit 15 for generating signals in a form suitable for directly controlling the robot 1 to execute the desired motions, an external input and output control circuit 16, a robot drive circuit 17, and a mode setting circuit 18 for setting a desired operating mode for the selector unit 14 and the control circuit 15.

The program memory unit 13 may be implemented as a plurality of RAMs and auxiliary power supplies or batteries which are automatically connected to the respective RAMs upon failure of the commercial power source so that the stored contents of the RAMs are protected at all times against accidental erasure.

When the operator selects a continuous operation mode using the mode setting circuit 18, the control circuit 15 instructs the selector unit 14 to deliver the content of one of the RAMs of the program memory 13 to the robot drive circuit 17. The external input and output control circuit 16 is responsive to motions of the robot 1, detecting with limit switches, encoders or the like its motion as a series of measured positional points and delivering the data of the measured points to the control circuit 15. The robot drive circuit 17 receives signals from the external input and output control circuit 16 and confirms such signals successively, and in response thereto, sends command signals to a drive source, such as motors, for the robot 1 for effecting the desired motions.

Program preparation and operation will now be described. The operator operates the input device 5 to supply input data, such as operational positions of the robot 1 expressed as planar (Cartesian) coordinate points X, Y and an angular displacement for a chuck, and external input conditions according to a predetermined program preparation procedure. The input data is temporarily stored in the memory 7 through the program editing arithmetic processor 6 and then stored in its edited, completed form in the external memory 8 at specified addresses. During the program preparation procedure, the display unit 9 displays the stored content as desired.

When the programming unit 2 is to transfer a program stored in the external memory 8 to the robot control unit 3, the programming unit 2 and the robot control unit 3 are interconnected as an on-line system, and thereafter a specified program is read temporarily from the external memory 8 into the memory 7 utilizing a predetermined input operation for program transfer. Then, the program editing arithmetic processor 6 is used to convert the content of the memory 7 into polar coordinates and then into machine language employing specified arithmetic operations. The data expressed in machine language is fed through the communication circuit 11 and the communication cable 4 to the communication circuit 12 in the robot control unit 3. At this time, the robot control unit is set in a program storing mode by the mode setting circuit 18, with the selector unit 14 operated to designate storage addresses for data storage. The completed program is stored through the selector unit 14 into the RAM at the designated addresses. In this manner, the robot control unit 3 stores a plurality of edited, completed programs. Subsequently, the programming unit 2 is severed as an off-line system from the robot control unit 3 by disconnecting the communication cable 4.

The robot control unit 3 can now operate independently of the programming unit 2 for controlling the operation of the robot 1. The operator then controls the mode setting circuit 18 to enable the selector unit 14 to read a desired program from the program memory 13. The control circuit 15 reads the designated program and enables the robot drive circuit 17 so as to energize a drive source for driving an arm of the robot 1. At the same time, the control circuit 15 receives signals from the external input and output control circuit 16 which relate to the motions of the robot 1 and confirms such signals successively for operating the robot 1 under the control of the selected program.

As described above, the control system is composed of the independent programming unit 2 and robot control unit 3 which can be interconnected as desired. The programming unit 2 can be shared by several robots 1 to practical advantage. The robot control unit 3 need not be equipped with a memory of large storage capacity or an arithmetic unit of large capacity, and hence can be simple in construction.

Figure 2:
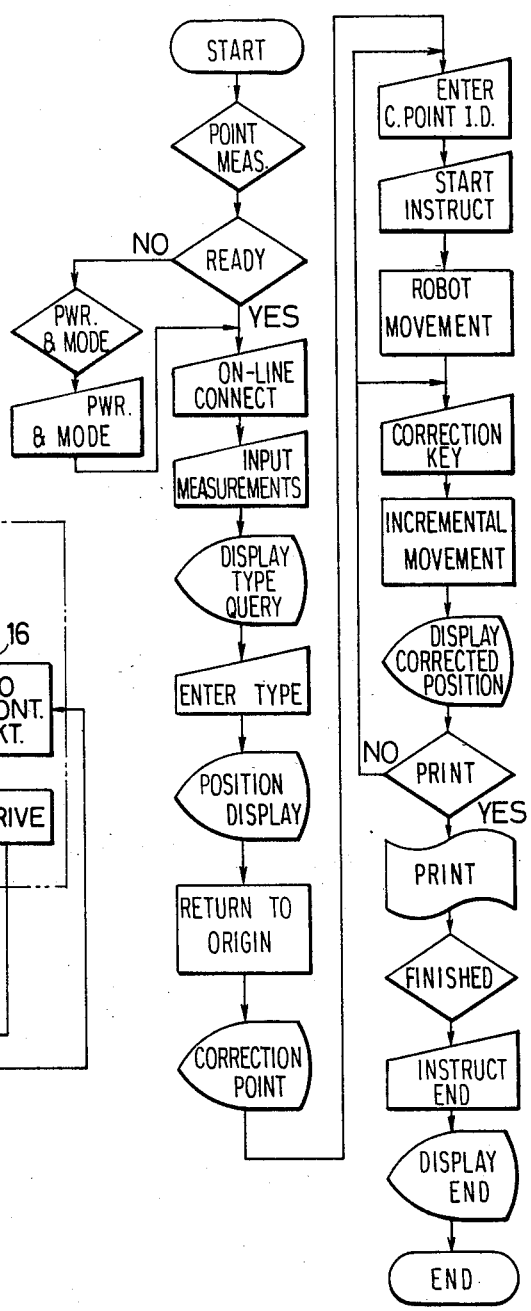
FIG. 2 is a flowchart illustrating a point measuring process according to the present invention.

The point measuring process according to the present invention is carried out only with respect to specifically required motion points where high accuracy is required. The point measuring process is effected according to the procedure shown in FIG. 2. First, the operator places a workpiece such as a printed circuit board at a work position of the robot 1. Then, the procedure is started at a Step 1. It is determined at a Step 2 whether points should be measured and at a Step 3 whether the robot 1 is ready or not. If the robot 1 is not yet ready, the power supply and operating mode are confirmed at a Step 4. Based on the results of the confirmation, the operator turns on the power supply of the robot control unit 3 or operates the mode setting circuit 18 to set a mode at a Step 5. Then, the programming unit 2 and the robot control unit 3 are interconnected as an on-line system in a Step 6, and point measurements are inputted through the input device 5 at a Step 7. At this time, the display unit 9 displays an inquiry as to the type of robot used at a Step 8, and the operator operates the input device 5 to supply an input indicative of the robot type at a Step 9. The display unit 9 then displays an original position in X-Y coordinates and an angular displacement at a Step 10. During program preparation, the robot 1 should be placed in a starting position. If the robot 1 is not in the specified starting position, then it is automatically returned to the starting position at a Step 11.

The display unit 9 now displays an inquiry as to a correction point at a Step 12. The operator operates keys of the input device 5 to supply an input for measuring point coordinates at a Step 13, and then instructs starting at a Step 14. Although the basic coordinates of the desired path of movement can be provided on a graphical representation or the like, approximated numerical values will suffice if no other data is available. The robot now starts moving at a Step 15 and continues until it reaches the position expressed by the coordinates of the desired path of movement. Actual coordinates at this time are delivered from the external input and output control circuit 16 through the control circuit 15 and the selector unit 14 to the programming unit 2 and are displayed by the display unit 9.

The operator then depresses a correction key of the input device 5 in order to effect a corrective action at a Step 16. Each time the correction key is depressed, the robot 1 is moved through a small distance, 0.05 mm for example, at a Step 17. (The small distance that the robot 1 moves may be on the order of 1 mm depending on the desired accuracy). When the correction key is depressed, the coordinates of the desired path of movement are corrected and sent from the robot control unit 3 to the programming unit 2. The display unit 9 displays such corrected coordinates at a Step 18. When the correction is completed, it is determined at a Step 19 whether or not the program is to be printed, and depending on that determination, the printer 10 starts printing at a Step 20. Thereafter, it is determined at a Step 21 whether the corrective procedure is finished. If the operator depresses a key to indicate the end of the procedure at a Step 22, then such ending is indicated by the display unit at a Step 23, and the procedure is brought to an end.

The foregoing procedure has been described as effecting correction with respect to a single point on the desired path of movement. If there are other points on the desired path of movement to be corrected, the procedure goes back to the correction Step 16 or the input Step 13 after the print determination Step 19 to thereby repeat the corrective action for each point required.

With the arrangement of the present invention, a program is basically prepared using a preset process in which operating program data is inputted as coordinate points derived from a graphical representation. Thereafter, for regions where an accuracy greater than that which can be provided with a graphical representation or the like is needed, corrective inputs are supplied by positioning the robot along the actually desired locus point by point and correcting the stored data representing the desired path of movement in accordance with the actual position of the robot. With this procedure, a program which is of high precision and high adapability can be prepared.

We claim:

1. A method of programming a robot, said robot being of the type including: a programming unit for generating a final program defining a movement path including a plurality of positions to which a robot element is to be moved, said programming unit including input means for operator input of coordinate data corresponding to said plurality of positions; a robot control unit for storing said program and for providing said program as a control output for moving said robot element; movement means for moving said robot element in accordance with said control output; and sensing means for sensing the position of said robot element and for providing a position signal representing the coordinate data corresponding to the sensed position, said method comprising the steps of:

moving said robot element to at least one position desired as one of said plurality of positions;

generating via said sensing means a position signal representing the correct coordinate data corresponding to said at least one position; and generating said final program using said correct coordinate data.

2. A method as defined in claim 1, wherein said method further comprises the step of generating an approximated program in said programming unit in accordance with coordinate data entered via said input means and representing a sequence of said plurality of positions, and wherein said step of generating said final program comprises substituting said corrected coordinate data for the approximated coordinate data corresponding to said at least one position in said approximated program, wherein said final program comprises a mixture of approximated and corrected coordinate data.

3. A method as defined in claim 1, further comprising the steps of loading said final program into said control unit and disconnecting said programming unit from said control unit.

4. A method as defined in claim 1, wherein said step of generating a position signal includes displaying said corrected coordinate data via said programming unit.

5. A method as defined in claim 1, further comprising the steps of generating a plurality of final programs in said programming unit, storing said plurality of final programs in said control unit and disconnecting said programming unit from said control unit.

* * * * *

UNITED STATES PATENT AND TRADEMARK OFFICE
CERTIFICATE OF CORRECTION

PATENT NO. : 4,595,989

DATED : June 17, 1986

INVENTOR(S) : Kazuyoshi Yasukawa et al

It is certified that error appears in the above-identified patent and that said Letters Patent is hereby corrected as shown below:

```
Title page, Item (30) delete "Oct. 5, 1981 (FR) France
.....81 158477" and insert -- Oct. 5, 1981 (JP) Japan
.....56-158477 --.
```

Signed and Sealed this

Seventeenth Day of March, 1987

Attest:

DONALD J. QUIGG

*Attesting Officer*   *Commissioner of Patents and Trademarks*